No. 729,506. PATENTED MAY 26, 1903.
A. McMURTRIE.
COUPLING FOR ELECTRICAL CONDUITS.
APPLICATION FILED NOV. 21, 1902.
NO MODEL.

Witnesses
Ivan Konigsberg
Harry H. Walton.

Inventor
Adual McMurtrie
By his Attorney
Alexander C. Proudfit

No. 729,506.　　　　　　　　　　　　　　　　　　　　　　　　Patented May 26, 1903.

UNITED STATES PATENT OFFICE.

ADNAH McMURTRIE, OF NEW YORK, N. Y., ASSIGNOR TO THOMAS & BETTS, OF NEW YORK, N. Y.

COUPLING FOR ELECTRICAL CONDUITS.

SPECIFICATION forming part of Letters Patent No. 729,506, dated May 26, 1903.

Application filed November 21, 1902. Serial No. 132,272. (No model.)

*To all whom it may concern:*

Be it known that I, ADNAH MCMURTRIE, of New York, State of New York, have invented certain Improvements in Couplings for Electrical Conduits, of which the following description, in connection with the accompanying drawings, is a specification, like numerals on the drawings designating like parts.

My invention has for its object the provision of a coupling to join conduits without the necessity for threading the pipe ends, the same being of notable utility in connecting pipes for electrical conduit in house-wiring, where the expense of cutting threads upon pipes "on the job" is a very considerable item, although I contemplate the utilization of my improvements in any field for use in which they are adapted by their nature.

The various features of my invention will be illustrated and described fully in the accompanying drawings and specification, and pointed out in the claims.

Figure 1:
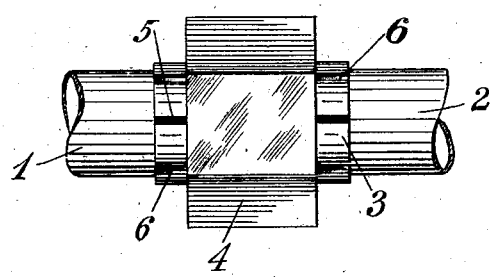
Figure 2:
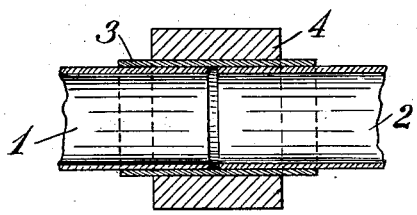
Figure 4:
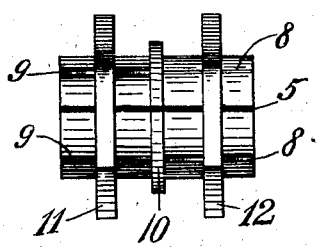
Figure 5:
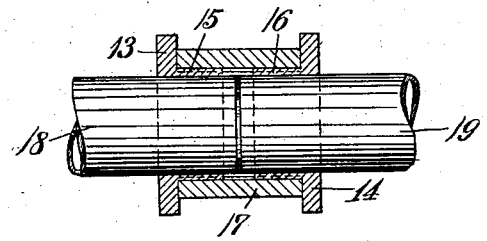
Figure 6:
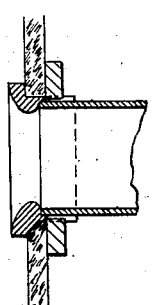

In the drawings, Figure 1 shows in side elevation a coupling in the construction of which my invention has been embodied. Fig. 2 is a vertical longitudinal section of the same, and Fig. 3 an end elevation. Fig. 4 is a view, similar to Fig. 1, of a modified form of coupling; and Fig. 5 a view, similar to Fig. 2, of still another modification, while Fig. 6 shows a coupling of the style illustrated in Fig. 5 applied to the junction of a pipe with an outlet-box.

Figure 3:
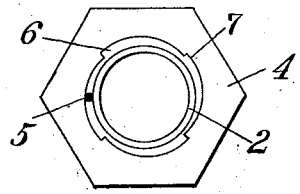

In the embodiment of my invention selected for illustration and description as a convenient form to enable a ready and complete understanding of my improvements, referring to Figs. 1 to 3, the reference-numerals 1 and 2 designate two pipes of the kind used ordinarily for electrical conduit in house-wiring, the numeral 3 designates a sleeve member slipped over the adjacent ends of said pipes, respectively, and 4 designates a nut inclosing said sleeve.

The sleeve 3 may have a bore of cylindrical section, as indicated in Fig. 3, or may be of other suitable contour, and in accordance with my invention is of compressible construction, this capability being secured in the instance illustrated by a longitudinal slot 5, running from end to end of the sleeve.

Means are provided to compress the sleeve, one convenient form of such means being presented by the coöperating cam-surfaces 6 and 7 on the exterior of the sleeve and interior of the nut, respectively, and upon turning the nut relatively to the sleeve the latter will be clamped upon the pipe ends and will couple them together.

Where there is any considerable difference in the size of the pipes to be coupled, a plurality of nuts may be provided in place of a single nut, these nuts operating near the respective ends of the pipes, as shown in Fig. 4, where, however, the cam surfaces upon the sleeve, instead of running from end to end of the sleeve, are divided into two series 8 and 9, facing in opposite directions and separated, if desired, by a central ridge 10, to prevent the nuts 11 and 12 from displacement past the center.

This form of coupling is convenient in that it permits the fastening of the coupling merely by putting wrenches on the nuts 11 and 12 and twisting them in opposite directions.

In another modification of my invention (illustrated in Fig. 5) two bushing members 13 and 14, having, respectively, split shanks, lettered 15 in one case and 16 in the other case, are thrust within a nut 17, similar to the nut 4, (shown in Fig. 1,) and when these bushings are turned relatively to the nut or the nut turned upon them their split shanks are compressed upon the pipe ends 18 and 19 to couple the latter.

Having thus described and illustrated my invention fully, I wish it understood that I do not limit myself to the specific construction shown and described, nor in general otherwise than as set forth in the claims, read in connection with this specification.

What I claim, and desire to secure by Letters Patent, is—

1. A threadless coupling of the class described comprising a compressible member to be seated upon and engage a conduit end and presenting outwardly cam-surfaces and a compressing member to be seated upon said compressible member and provided with coöperating cam-surfaces to compress the same when rotated thereupon.

2. A threadless coupling of the class described comprising a compressible member to receive the ends of abutting adjacent pipes and presenting outwardly cam-surfaces, and a nut or compression member to be seated upon said sleeve and having coöperating cam-surfaces to compress the latter when rotated thereupon.

3. A coupling of the class described comprising a split-sleeve member presenting longitudinal cam-surfaces outwardly, and a nut member provided with cam-surfaces to engage and compress said split sleeve member when rotated thereupon.

4. A coupling of the class described comprising a plurality of split-sleeve members to be seated respectively upon adjacent ends of abutting pipes and presenting outwardly longitudinal cam-surfaces, and a nut or compression member having inner cam-surfaces to be seated upon said sleeve members and rotatable thereupon to compress the same.

5. A coupling of the class described comprising a plurality of bushings having shanks to be seated upon and engage respectively adjacent ends of abutting pipes and having operating-heads, a nut to be seated upon said shanks between said operating-heads, and means intermediate said nut and shanks to compress said shanks upon rotation of said parts relatively to each other, substantially as described.

Signed at New York, in the county of New York and State of New York, this 17th day of November, A. D. 1902.

ADNAH McMURTRIE.

Witnesses:
ALEXANDER C. PROUDFIT,
BURTON E. EMORY.